March 12, 1957     G. H. HEISER     2,784,822
HYDRAULICALLY OPERATED DISCONNECT COUPLING
Filed Oct. 28, 1955     2 Sheets-Sheet 1

WITNESSES

INVENTOR
George H. Heiser
BY
ATTORNEY

March 12, 1957  G. H. HEISER  2,784,822
HYDRAULICALLY OPERATED DISCONNECT COUPLING
Filed Oct. 28, 1955  2 Sheets-Sheet 2
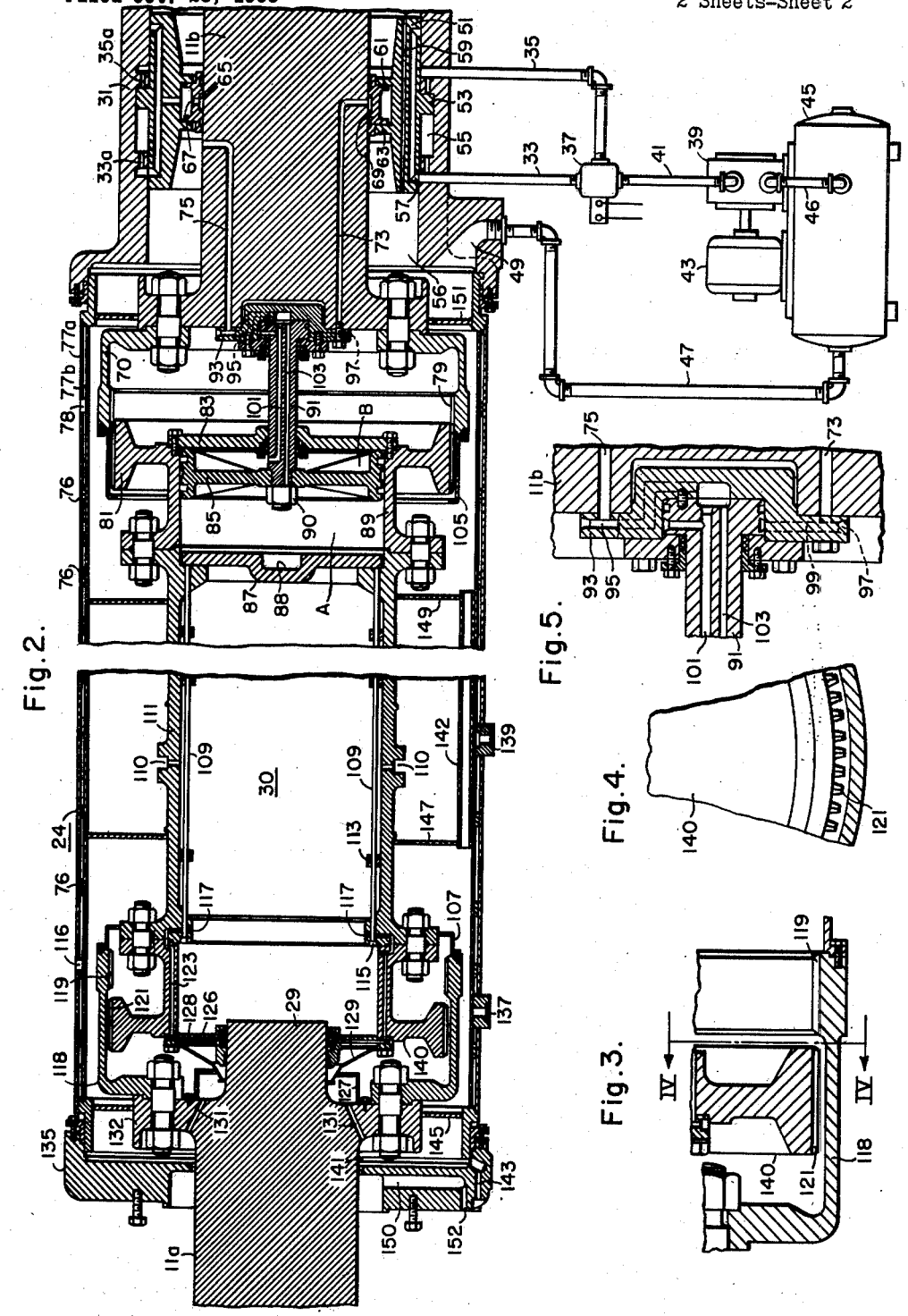

United States Patent Office 2,784,822
Patented Mar. 12, 1957

2,784,822

HYDRAULICALLY OPERATED DISCONNECT COUPLING

George H. Heiser, Saratoga, Calif., assignor to Westinghouse Electric Corporation, East Pittsburgh, Pa., a corporation of Pennsylvania Application October 28, 1955, Serial No. 543,473

4 Claims. (Cl. 192—86)

My invention pertains to mechanical coupling devices and, more particularly, to devices for coupling together shafts of great length and diameter for operating at high rotational speeds and elevated temperatures.

The ever-increasing operating speeds of modern day aircraft makes it imperative that wind tunnel facilities be provided which have air velocities which are greater than the speed of the aircraft under design at the moment and to be designed in the foreseeable future. The many advantages of axial flow compressors makes their use desirable in wind tunnel applications; among such advantages may be listed the requirement of fewer operating parts, less complicated ducting and valving and the fact that the compressors may be installed within the tunnel structure. In conjunction with the use of axial flow compressors, it is further desirable to use constant-speed drive motors. The reason for this is that in a variable-speed compressor system, reduction of compressor speed not only produces lower compressor discharge pressure but also reduces the flow volume produced according to a fixed law. This fixed relationship between rotative speed, pressure and flow volume is most inconvenient when it is desired to increase volume flow as discharge pressure is decreased. The use of a plurality of fans operating in tandem with a constant speed drive motor makes it necessary, therefore, to vary the air velocity by adjusting the angle of the fan blades and by bypassing or valving at least a portion of the air flow volume at the output of a given compressor fan around the following compressor sections. Bypassing or valving also is one way to match the compressor characteristic to the tunnel characteristic and also makes possible higher speeds for a given compressor ratio.

Obviously, when the discharge of a given compressor section is bypassed around the following sections, it is almost mandatory that the following sections be disconnected from the driving sections, assuming that all of the compressor sections are driven from a common motor. The large size of the compressors to be coupled in wind tunnel systems of the size required for full scale testing of aircraft and aircraft components at transonic and supersonic air velocities makes supporting structures of the compressor parts large and bulky. The temperature variations from part to part and from compressor to compressor magnifies the difficulty of obtaining proper alignment of the compressors in relation to each other.

The coupling between the tandem connected shafts must be capable of transmitting tremendous horsepower and must be adapted for ready connection and disconnection. Hydraulic control of the coupling device is desirable since manual control is generally unfeasible because of the great weight of the parts involved and the difficulty of providing physical access thereto.

It has been known in the past to support shafts of considerable length which are to be aligned by means of a spring loaded device to obtain alignment of the shafts when they are to be coupled together, and to provide hydraulic systems for controlling coupling and decoupling. Typical of the prior art of this nature is U. S. Patent 2,489,258 to C. N. Bebinger et al. It has been found that such devices are unsuitable for use with axial flow air compressors operating at high rotative speeds because of the tremendous weight of the shafts to be coupled and the inherent alignment problems associated therewith. A coupling device such as described by Bebinger et al. obviously requires means for maintaining alignment between driving and driven components when the coupling is in the disconnected position.

Accordingly, one object of this invention is to provide a coupling for shafts which tolerates misalignment of the compressors when operating connected and further provides alignment of the coupling shafts when operating disconnected.

Another object is to provide a hydraulic control system for a coupling device utilized in coupling together such coupling shafts and their driving and driven objects.

A still further object is to provide a coupling system for coupling together shafts which are not readily accessible to manual coupling devices.

Other objects and features of my invention will be apparent upon consideration of the following detailed description thereof when taken in connection with the accompanying drawings, wherein:

Fig. 2 is a sectional view illustrating one embodiment of my invention;

Fig. 3 is a sectional view of portions of gearing illustrated in Fig. 2;

Fig. 4 is a sectional view taken along line IV—IV of Fig. 3; and

Fig. 5 is an enlarged sectional view of a portion of Fig. 2.

Figure 1:
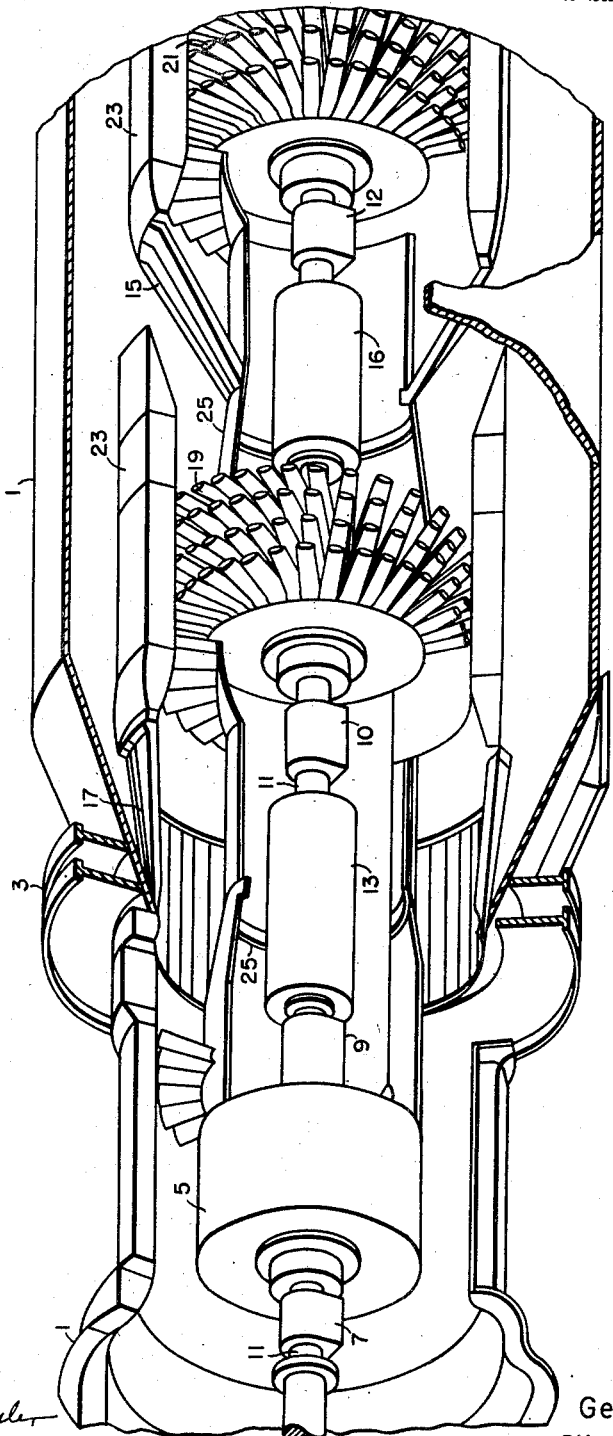
Figure 1 is a side view, partly in cross section, of an axial flow air compressor system illustrating the use of the coupling device which is the subject matter of my invention.

The type of apparatus here under consideration is depicted by the axial-flow air compressor system illustrated in Fig. 1 wherein reference numeral 1 designates the bypass shell of the air compressor, the sections of which are joined by anchor member 3.

The compressor rotor members are surrounded by stator shells 23 to which are hinged the leaves of iris valves 17, the purpose of which iris valves is to bypass air around the respective compressor rotor members associated therewith when such bypassing is desirable. Similarly, each of the additional compressors has in conjunction therewith a similar set of iris valve leaves. The leaves are allowed to be operated so as to be in contact with nacelle 25 when it is desired to bypass the flow of air around the particular compressor section associated therewith and arranged so as to be in contact with the immediately preceding compressor when the particular compressor section is in operation.

The details of the hydraulic disconnect couplings 13 and 16 are shown in Fig. 2, wherein 11a designates the shaft to which power is applied and 11b designates the output shaft. The disconnect coupling is enclosed within a housing 24 having an outer cylindrical shell 77a and an inner cylindrical shell 77b which are coaxial and spaced from each other by a plurality of annular spacer rings 76. The housing is supported at the input shaft end thereof by housing support bracket 135 which may be connected by struts or other suitable means to fixed sections of the compressor structure. The input shaft 11a includes a flange 132 to which is bolted a gear or spline member 118 having gear teeth or splines 119 on the interior surface thereof. Similarly, output shaft 11b is flanged so that gear member 70 may be bolted thereto. Gear member 70 is splined in the interior surface thereof in the same manner as gear member 118.

Coupling member 30, the function of which is to selectively connect and disconnect gear members 118 and 70, comprises a central, generally cylindrical member 111, to ends of which are connected two external gear carriers 140 and 89. The gear support members carry gear teeth 121 and 81 on the external surfaces thereof which are respectively adapted to engage internal gear teeth 119 and 79.

Input shaft 11a has a reduced section 29 at the end thereof having a cylindrical outer surface coaxial with the outer surface of the shaft. A support bracket 126 having a cylindrical inner surface adapted to slide over shaft reduced section 29 is bolted to gear member 140 so as to support the input end of coupling member 30 when gear teeth 121 are disengaged from gear teeth 119. The length of the gears 121 and 119 is somewhat less than that of gears 81 and 79 so that gears 81 and 79 are never completely disengaged.

Near gear teeth 119 and 81, oil sprays 116 and 78, respectively, are in the housing members 77a and 77b to provide inlet means for gear lubricating oil. Oil retainer baffles 107 and 105 are bolted to the ends of internal gear members 118 and 70 so that enough oil will be retained to properly lubricate the gears. Directly under gear carrier 118 an outlet port 137 is provided; at the bottom of the inner housing member 77b a conduit 142 is provided so that oil that overflows oil retainer 105 may flow through to the outlet port 137. Baffles 147 and 149, which are annular in shape, are secured to the inner casing 77b and are provided to keep the oil from another source separated from the gearing oil, as will be made evident below.

The interior of gear carrier 89 is cylindrical and generally coaxial with shaft 11b. At the input end thereof there is disposed an end plate 87 having a recess 88 centrally located thereon; at the other end of the gear member there is bolted another end plate 83. The combination of end plates 87 and 83, and the cylindrical inner surface of gear carrier 89 forms a piston cylinder within which is disposed piston 85. Piston 85 has bolted thereto, by means of nut 90, a piston shaft 91, nut 90 is adapted to fit into recess 88 so that end plate 87 together with the whole movable coupling may be driven into contact with piston 85 as it moves to the right to engage driving shaft 11a to driven shaft 11b. At the right end of piston shaft 91, the shaft is bolted to a distribution plate 93 which, in turn, is bolted to the end of output shaft 11b. The function of the distribution plate is to provide conduits for hydraulic fluid flowing from drilled passages 73 and 75 within the interior of input shaft 11b to drilled passages 101 and 103, respectively, within piston shaft 91. Passages 101 and 103, respectively, open to the right and to the left sides, as viewed, of piston 85 to exert a differential pressure across the faces of the piston. As shown most perspicuously in Fig. 5, drilled passage 73 is connected to a hole 99 plugged at one end by member 97, and which is in fluid communication with the hole 101 within the piston shaft 91 that opens into piston chamber B. Similarly, drilled passage 75 is in fluid communication with channel 95 which is in communication with the hole 103 within piston shaft 91 that opens into piston chamber A.

Conduits 73 and 75 open on the exterior cylindrical surface of output shaft 11b at a spaced interval along the longitudinal axis of the shaft, as shown. Oil from sump 45 is pumped by means of oil pump 39 to conduits 33 and 35 through solenoid actuated directional valve 37, the function of which is to direct oil entering the valve from pump 39 through conduit 41 to one or the other of conduits 33 and 35. Conduits 33 and 35 extend through housing support bracket 31 at spaced intervals along the longitudinal axis of the bracket. An annular slot 55 is cut in the interior surface of the bracket to accommodate a projection 53 on the exterior surface of sliding bearing 51. Conduits 33 and 35 are in fluid communication with opposite sides of the slot through channels 33a and 35a so that the projection 53 acts as a piston to move sliding bearing 51 to the right or to the left, in accordance with which of conduits 35 or 33 is under fluid pressure.

A bore 57 is drilled within sliding bearing 51 so as to be in fluid communication with conduit 35 when bearing 51 is at the left extremity of its movement and in fluid communication with conduit 33 when at the right extremity of its movement. In other words, when conduit 35 is under fluid pressure the right side of projection 53 will be under pressure through channel 35a so as to move the bearing to the left; when the bearing is moved as far to the left as is possible the right-hand opening of bore 57 will be directly over conduit 35 so as to be in fluid communication therewith. Similarly, when conduit 33 is under fluid pressure, projection 53 will be forced to the right and move the sliding bearing until the left-hand opening of bore 57 is in position to be in fluid communication with conduit 33.

Sliding bearing 51 is provided with a pair of flanges 63 which define a race within which flanges 61 of inner bearing member 69 are adapted to provide for rotation of shaft 11b. Inner bearing member 69 has an annular slot on the inner surface thereof which is in communication with a groove of annular cross-section which is defined by annular flanges 61 through a radial bore 67. Outer bearing member 51 is secured against rotation by means of a key or other convenient means (not shown). The purpose for providing two sliding bearings in the manner described above is to effect a substantially fluid-tight passage between conduits 33 and 73 and between conduits 35 and 75 in spite of lack of exact coaxial disposition of shaft 11b and bracket or housing 31. The cooperating flanges 61 and 63 allow relative reciprocating motion between the two members as shaft 11b rotates and yet preserve the substantially fluid-tight coupling between the passages as is desired.

The spacing between passages 73 and 75 should be substantially equal to the extent of the longitudinal movement of outer bearing member 51 as determined by the relative dimensions of projection 53 and annular slot 55 so that annular groove 65 will line up over passage 73 when bore 57 is in fluid communication with passage 33, and will line up over conduit 75 when bore 57 is in fluid communication with conduit 35.

A longitudinal bore 59 is drilled through outer bearing member 51 so that hydraulic fluid draining from passage 73, as described below, may return to sump 45 through chamber 56, chamber 49, and drain pipe 47. Passage 75 will drain directly into chamber 56 when the sliding bearing members are at the right extremity of their movement. A baffle 151 is provided to prevent mixing of gear oil and oil for control purposes draining from passages 73 and 75.

Lubrication for support member 126 when it is supported by extended section 29 of input shaft 11a is provided through oil lines 128 and 123 which are drained within support member 126 and gear carrier 140. The oil supply is derived from the piston chamber A of piston 85 as the coupling member is driven to the left by oil pressure from line 33. Oil line 109 is in fluid communication with the chamber A defined by end plate 87, piston 85 and cylinder 89 through orifices within the end plate (not shown).

The function of the oil passages 150 and 152 within housing support bracket 135 is to provide drainage for oil from the upstream bearing 9 of shaft 11a. Oil passage 131, chamber 141 and passage 143 provide one oil return path for oil supplied to the cylindrical bearing surface of extended section 29 back to sump 45. Another path for the return of oil from this bearing surface to sump 45 is through the interior of coupling shaft 111, and drain ports 110 and 139.

To facilitate engagement of gears (or splines) 121 and 119 the teeth of gears 121 are relieved at the right leading edge thereof, and the teeth of gears 119 are relieved at the left leading edge thereof. Relieving the teeth in this manner makes it unnecessary to exactly align the gear sections as would ordinarily be necessary to make it possible to smoothly engage the gear teeth when the gears are being coupled together.

The coupling member is shown in Fig. 3 in its disengaged position. To couple shaft 11a to shaft 11b, solenoid operated valve 37 is switched so that fluid pressure from line 41 is coupled to line 33. Fluid pressure on projection 53 will move outer sliding bearing 51 to the right until annular groove 65 is over passage 73. Fluid pressure now exerted upon end plate 83 will move the entire coupling member to the right, the teeth of gear 121 engaging the teeth of gear 119 and moving the coupling member either slightly clockwise or counterclockwise as necessary by virtue of the tapered construction of the teeth as described above. When the teeth are fully engaged, hydraulic pressure will still be exerted on end plate 83 to insure that the coupling is maintained in spite of vibrations and other factors which would tend to move the coupling member to the left.

To decouple shaft 11a from shaft 11b, solenoid valve 37 is switched to divert fluid pressure to line 35, sliding bearing 51 thereupon will be moved to the left until annular groove 65 of bearing member 69 is over passage 75. The fluid pressure from pump 39 will now be exerted on end plate 87 to move the entire coupling member 30 to the left, thereby disengaging the teeth of gear 121 from those of gear 119. Support member 126 will slide smoothly over extended section 29 of shaft 11a and oil from the piston chamber A of piston 85 will flow through passages 109, 123 and 128 to lubricate the bearing surface as shaft 11a rotates.

The coupling device that has been described has been designed to couple shafts transmitting 248,000 horsepower, the coupling shafts being up to 36 inches in diameter and 10'7" in length. The lack of true alignment between the driving and driven components will be overcome by the coupling. The hydraulic control will provide a flexible, trouble free means for controlling the coupling and decoupling of the components.

The invention is not to be restricted to the specific structural details or arrangement of parts herein set forth, as various modifications thereof may be effected without departing from the spirit and scope of this invention.

I claim as my invention:

1. In a control for a reciprocating piston chamber having a rotating piston associated therewith, said piston being connected to a rotating shaft, first and second fluid conduits within said shaft establishing fluid communication between opposite faces of said piston and axially spaced points on said shaft; a fixed casing surrounding said shaft with an annular slot on the inner surface thereof for receiving an annular projection on an axially slidable reciprocating member adapted to slide axially on the interior surface of said fixed casing; third and fourth fluid conduits for establishing fluid communication between the exterior of a source of fluid pressure and the interior of said casing, said third and fourth conduits opening to the interior of said casing on opposite sides of said slot and also opening to said slot at opposed sides thereof on opposite sides of said projection, said projection functioning as a piston to move said axially slidable member in one direction or the other in accordance with the relative pressure on said third and fourth conduits; said axially slidable member having fluid conduits therein for establishing fluid communication between said first and third fluid conduits at one extreme of travel thereof, and between said second and fourth fluid conduits at the opposite extreme of travel thereof.

2. In a control for a reciprocating piston chamber having a rotating piston associated therewith, said piston being connected to a rotating shaft, first and second fluid conduits within said shaft establishing fluid communication between opposite faces of said piston and axially spaced points on said shaft; a fixed casing surrounding said shaft with an annular slot on the inner surface thereof for receiving an annular projection on an axially slidable reciprocating member adapted to slide axially on the interior surface of said fixed casing; third and fourth fluid conduits for establishing fluid communication between a source of fluid pressure and the interior of said casing, said third and fourth conduits opening to the interior of said casing on opposite sides of said slot and also opening to said slot at opposed sides thereof on opposite sides of said projection, said projection functioning as a piston to move said axially slidable member in one direction or the other in accordance with the relative pressure on said third and fourth conduits; said axially slidable member having fluid conduits therein for establishing fluid communication between said first and third fluid conduits at one extreme of travel thereof, and between said second and fourth fluid conduits at the opposite extreme of travel thereof, said axially slidable member comprising a first section having an outer surface in close fit with the inner surface of said casing, and a second member having an inner surface in close fit with the outer surface of said shaft, said first and second members having interfitting sections permitting fluid interconnection therebetween, coupling said first and second members together and permitting relative radial movement therebetween.

3. In a coupling device for first and second rotatable shafts in substantially axial alignment, each of said shafts respectively having first and second gear members connected thereto; a coupling member having gear members connected thereto adapted to mesh with said first and second gear members, said coupling member being in substantial axial alignment with said shafts and axially movable so that said gear members thereof mesh in one terminal position thereof with said first and second gear members; a portion of said coupling member forming a piston cylinder for a non-axially movable piston having two faces and connected to said second shaft such that said coupling member moves toward said one position with a differential pressure of one sense across said piston, and away from said one position with a differential pressure of the opposite sense across said piston; first and second fluid conduits at least partially within said second shaft, in fluid communication with opposite faces of said piston and respectively opening to the surface of said second shaft at first and second positions longitudinally spaced along said second shaft; a stationary tubular casing for said second shaft having an annular U-shaped slot on the inner surface thereof, an annular member adapted for axial reciprocating movement on the inner surface of said casing and having an annular projection in mating relationship with said slot such that said projection acts as a piston for axial reciprocating movement to first and second extremities of said slot, third and fourth fluid conduits in fluid communication with the interior of said casing on opposite sides of said U-shaped slot, and also in fluid communication with opposite sides of said slot such that fluid pressure in said third conduit will exert pressure on said projection to move said annular member in one direction and fluid pressure in said fourth conduit will exert pressure on said projection to move said annular member in the opposite direction, said annular member having fluid conduits therewithin such that said third conduit is in fluid communication with said first fluid conduit when said projection is at said first extremity of said slot and said fourth conduit is in fluid communication with said second conduit when said projection is at said second extremity of said slot.

4. In a coupling device for first and second rotatable shafts in substantially axial alignment, each of said shafts respectively having first and second gear members connected thereto; a coupling member having gear members connected thereto adapted to mesh with said first and second gear members, said coupling member being in substantial axial alignment with said shafts and axially movable so that said gear members thereof mesh in one terminal position thereof with said first and second gear members; a portion of said coupling member forming a piston cylinder for a non-axially movable piston having two faces and connected to said second shaft such that said coupling member moves toward said one position with a differential pressure of one sense across said piston, and away from said one position with a differential pressure of the opposite sense across said piston; first and second fluid conduits at least partially within said second shaft, in fluid communication with opposite faces of said piston and respectively opening to the surface of said second shaft at first and second positions longitudinally spaced along said second shaft; a stationary tubular casing for said second shaft having an annular U-shaped slot on the inner surface thereof, an annular member adapted for axial reciprocating movement on the inner surface of said casing and having an annular projection in mating relationship with said slot such that said projection acts as a piston for axial reciprocating movement to first and second extremities of said slot, third and fourth fluid conduits in fluid communication with the interior of said casing on opposite sides of said U-shaped slot, and also in fluid communication with opposite sides of said slot such that fluid pressure in said third conduit will exert pressure on said projection to move said annular member in one direction and fluid pressure in said fourth conduit will exert pressure on said projection to move said annular member in the opposite direction, said annular member having fluid conduits therewithin such that said third conduit is in fluid communication with said first fluid conduit when said projection is at said first extremity of said slot and said fourth conduit is in fluid communication with said second conduit when said projection is at said second extremity of said slot, said annular member being formed in two sections, one being adapted to fit around the other so as to permit radial relative movement therebetween with interfitting flanges of generally cross section thereon, one fitting within the other in substantially fluid-tight engagement.

References Cited in the file of this patent

UNITED STATES PATENTS

| | | |
|---|---|---|
| 2,464,975 | Gibbs et al. | Mar. 22, 1949 |
| 2,489,258 | Behinger et al. | Nov. 29, 1949 |
| 2,640,573 | Shenk | June 2, 1953 |